United States Patent
Schenk

(10) Patent No.: US 9,718,135 B2
(45) Date of Patent: Aug. 1, 2017

(54) DRILL CHUCK

(71) Applicant: Roehm GmbH, Sontheim/Brenz (DE)

(72) Inventor: Peter Schenk, Niederstotzingen (DE)

(73) Assignee: Roehm GmbH, Sontheim/Brenz (DE)

( * ) Notice: Subject to any disclaimer, the term of this patent is extended or adjusted under 35 U.S.C. 154(b) by 58 days.

(21) Appl. No.: 14/700,515

(22) Filed: Apr. 30, 2015

(65) Prior Publication Data

US 2015/0314375 A1 Nov. 5, 2015

(30) Foreign Application Priority Data

Apr. 30, 2014 (DE) ........................ 10 2014 106 082

(51) Int. Cl.
| B23B 31/12 | (2006.01) |
|---|---|
| B23B 31/107 | (2006.01) |
| B23Q 3/12 | (2006.01) |

(52) U.S. Cl.
CPC ...... *B23B 31/1238* (2013.01); *B23B 31/1071* (2013.01); *B23B 2231/38* (2013.01); *B23Q 3/12* (2013.01); *Y10S 279/902* (2013.01); *Y10S 279/905* (2013.01); *Y10T 279/17632* (2015.01); *Y10T 279/17752* (2015.01); *Y10T 279/3406* (2015.01); *Y10T 279/3412* (2015.01)

(58) Field of Classification Search
CPC .......... B23B 31/1238; B23B 2260/022; B23B 51/12; B23B 2231/04; B23B 2260/138; B23B 31/1071; B23Q 3/12; Y10T 279/3406; Y10T 279/3418; Y10T 279/17632; Y10T 279/3412; Y10T 279/17752; Y10S 279/905; Y10S 279/902

See application file for complete search history.

(56) References Cited

U.S. PATENT DOCUMENTS

| 3,810,642 A * | 5/1974 | Derbyshire ......... B23B 31/1238 279/158 |
|---|---|---|
| 4,874,181 A * | 10/1989 | Hsu .......................... B23B 51/12 279/144 |
| 5,678,961 A * | 10/1997 | Fleege ................ B23B 31/1071 279/144 |
| 5,765,839 A | 6/1998 | Roehm |
| 6,648,563 B2 | 11/2003 | Roehm |
| 2005/0191139 A1* | 9/2005 | Hofbrucker ........... B25B 21/007 408/239 A |

(Continued)

FOREIGN PATENT DOCUMENTS

| DE | 101 51 581 B4 | 12/2013 | |
|---|---|---|---|
| DE | 102014207713 A1 * | 10/2015 | ............. B25B 23/00 |
| EP | 0 710 518 A2 | 5/1996 | |

*Primary Examiner* — Eric A Gates
*Assistant Examiner* — Chwen-Wei Su
(74) *Attorney, Agent, or Firm* — Muncy, Geissler, Olds & Lowe, P.C.

(57) ABSTRACT

A drill chuck having a chuck body that has a receptacle on its axially rearward end, having clamping jaws that can be moved relative to the chuck axis, and having a clamping sleeve that serves to move the clamping jaws. An adapter body can be placed in the receptacle and coupled in a torque-transmitting manner, which adapter body has an adapter receptacle for detachable connection to the drilling spindle of a power drill and has, in the wall of the adapter receptacle, at least one detent element that can be moved by a release sleeve.

3 Claims, 4 Drawing Sheets

(56) References Cited

U.S. PATENT DOCUMENTS

| | | | |
|---|---|---|---|
| 2006/0186609 A1* | 8/2006 | Baumann | B23B 31/1238 279/62 |
| 2014/0131959 A1* | 5/2014 | Tussing | B25F 3/00 279/143 |
| 2014/0346744 A1* | 11/2014 | Herr | B25F 3/00 279/144 |

* cited by examiner

DRILL CHUCK

This nonprovisional application claims priority under 35 U.S.C. §119(a) to German Patent Application No. 10 2014 106 082.2, which was filed in Germany on Apr. 30, 2014, and which is herein incorporated by reference.

BACKGROUND OF THE INVENTION

Field of the Invention

The present invention relates to a drill chuck having a chuck body that has a receptacle on a axially rearward end, having clamping jaws that can be moved relative to the chuck axis, and having a clamping sleeve that serves to move the clamping jaws.

Description of the Background Art

Drill chucks are known from practice and from the prior art, and are described in. for example, EP 0 710 518 A1, which corresponds to U.S. Pat. No. 5,765,839. Moreover, drill chucks are known from DE 101 51 581 B4, which corresponds to U.S. Pat. No. 6,648,563, in which a journal with a cross-section that is not rotationally symmetric is arranged at the axially rearward end of the drill chuck in order to be able to provide a rotationally fixed coupling to the drilling spindle of a power drill. This coupling is detachable, so the drill chuck can be replaced quickly by the means that a release sleeve associated with the power drill is moved.

The chuck body needed for this drill chuck is a custom-made product, which is associated with high costs, especially since the axial length of the chuck body is increased in addition and thus requires greater material usage.

SUMMARY OF THE INVENTION

It is therefore an object of the present invention to provide a drill chuck that can be manufactured economically.

This object is attained in an embodiment according to the invention in a drill chuck in that an adapter body can be placed in the receptacle and coupled in a torque-transmitting manner, which adapter body has an adapter receptacle for detachable connection to the drilling spindle of a power drill and has, in the wall of the adapter receptacle, at least one detent element that can be moved by a release sleeve.

This has the advantage that the drill chuck can be manufactured, assembled, and ground under conditions of mass production, while the adapter body, which can be inserted into the drilling spindle of a conventional drill chuck, and is provided in order to implement the quick-change characteristics.

The chuck body and the adapter body can be able to be connected by a threaded joint, and a drive insert can be pressed into the adapter body after the threaded joint is established to wedge the threads and transmit torque from the drilling spindle.

The threaded joint can be produced and implemented very economically, while the non-detachable connection between the chuck body and the adapter body that is desirable for the drill chuck according to the invention is established by the drive insert, which when pressed into the adapter receptacle causes wedging of the thread courses of the threads of the adapter body and chuck body that stand in threaded engagement.

It is preferred for the coupling to the spindle of the power drill for the drive insert to be designed to be non-round in cross-section and to project into the adapter receptacle.

Handling of the drill chuck according to the invention is further simplified when a control cam is implemented on the inner circumference of the release sleeve in order to bear against the detent element implemented as a detent ball, and when a return spring bears axially against the release sleeve.

The return spring can be braced against the clamping sleeve when the adapter body is attached to the chuck body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
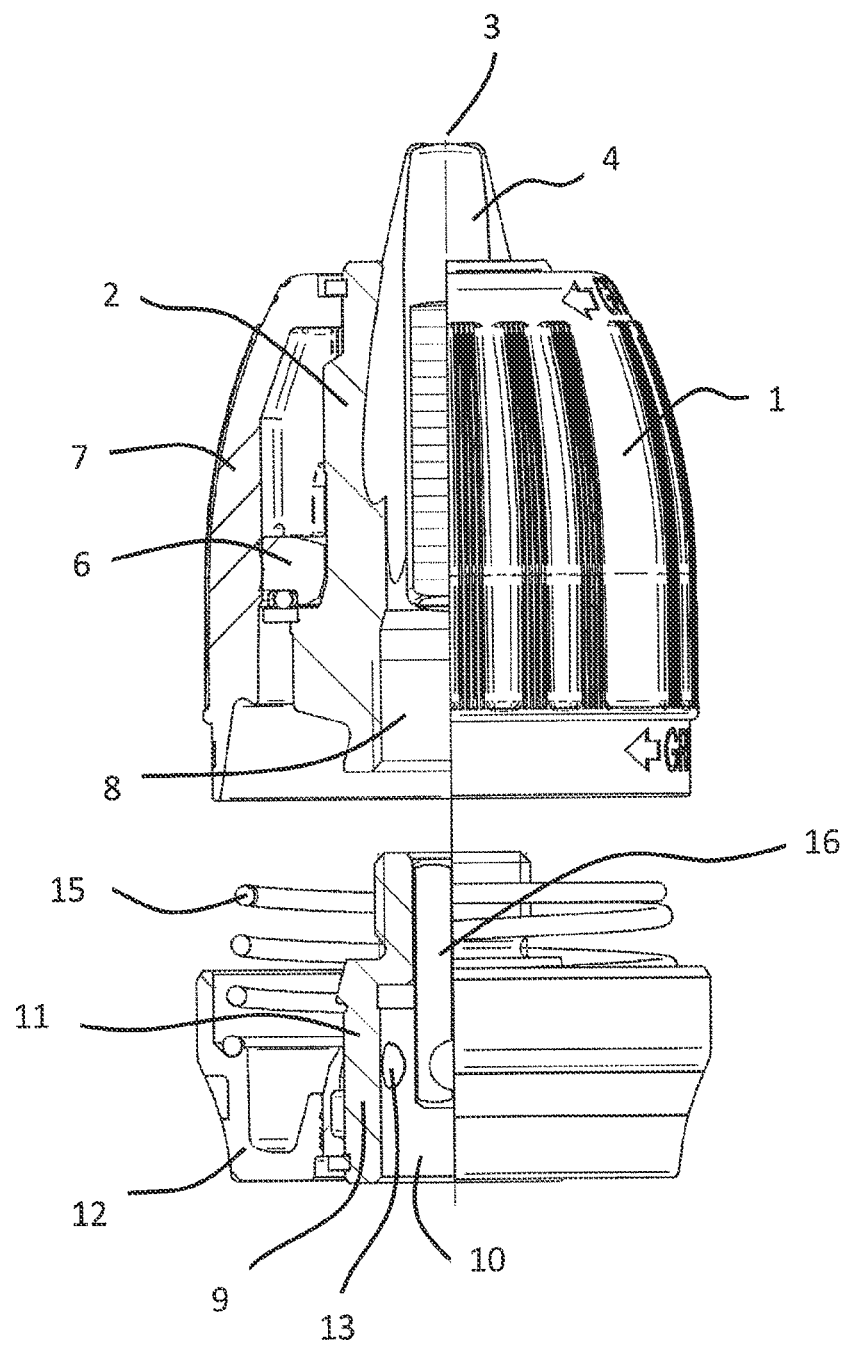
FIG. 1 a longitudinal section through the drill chuck according to the invention prior to connection of the adapter body to the chuck body, FIG. 2 a longitudinal section through the drill chuck according to the invention after connection of the adapter body to the chuck body, FIG. 3 a perspective, partially sectional view of the parts from FIG. 1, and FIG. 4 a view corresponding to FIG. 3 of the configuration from FIG. 2.
Figure 2:
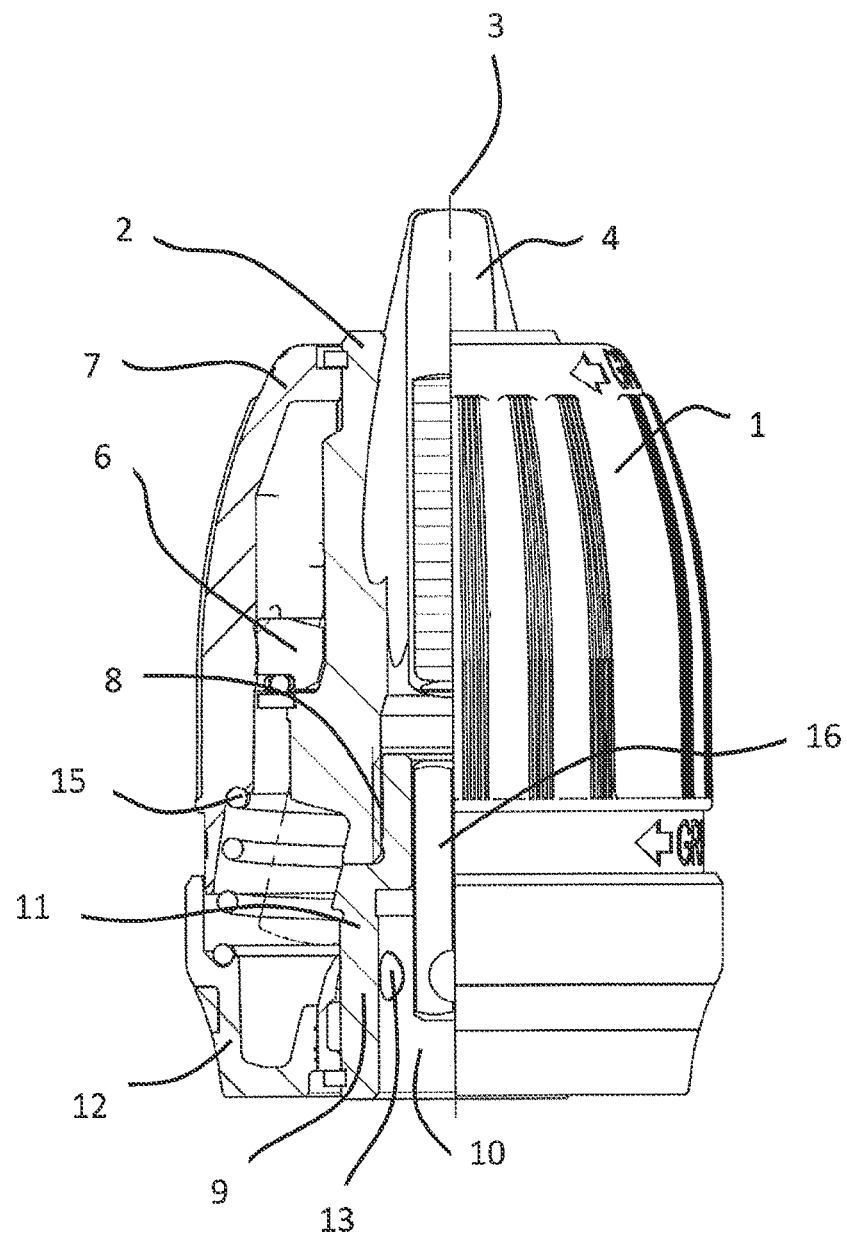
Figure 3:
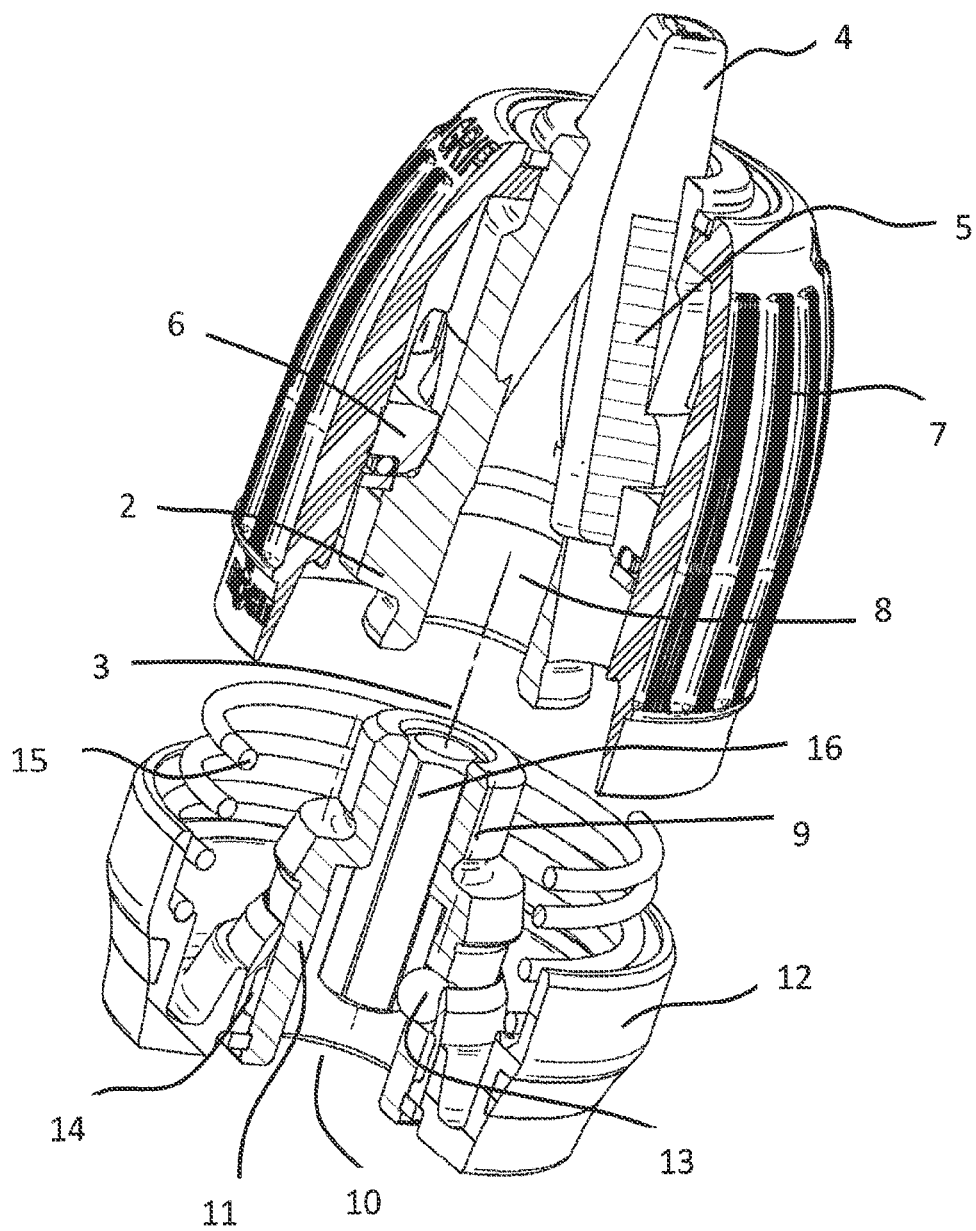
Figure 4:
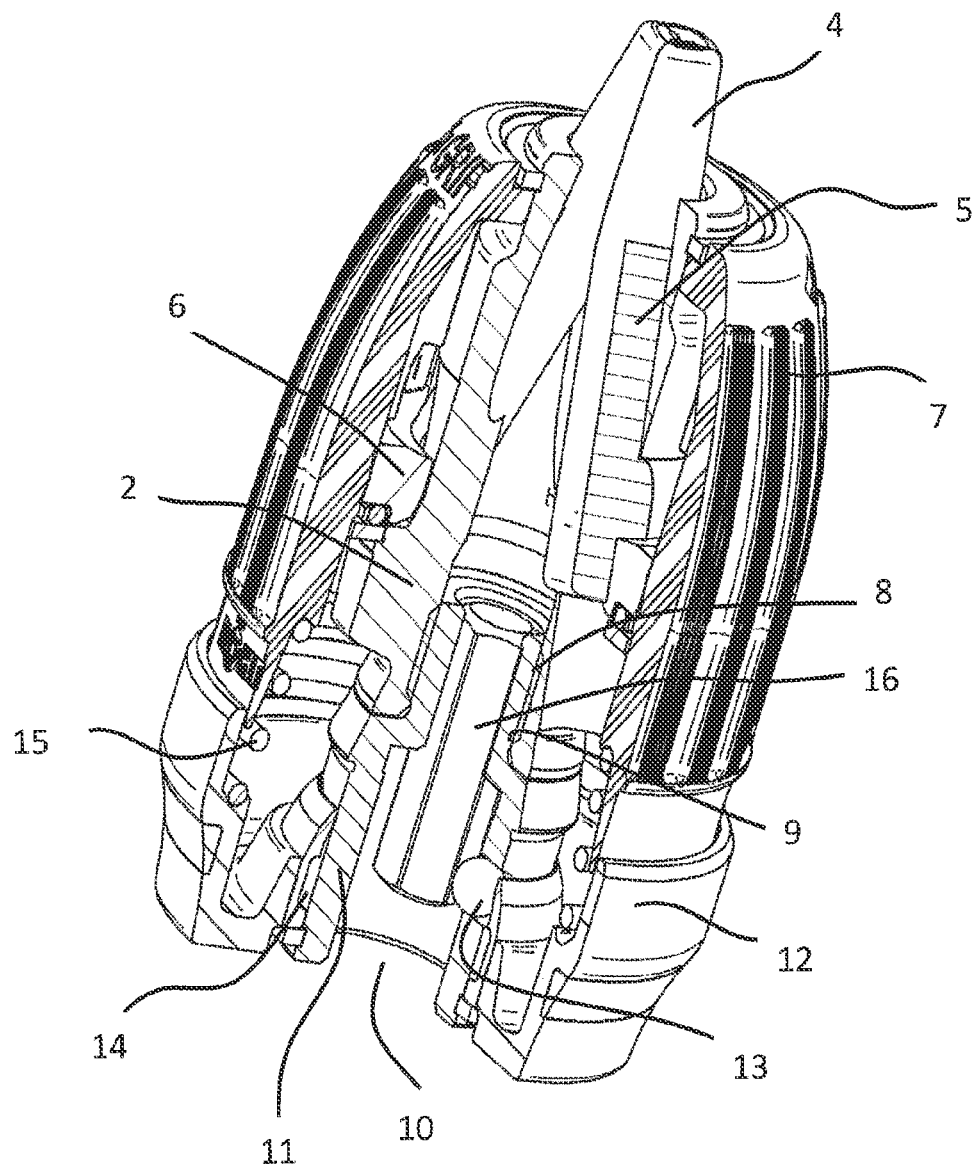

In the drawings, a drill chuck 1 is shown in FIG. 1. This drill chuck 1 has a chuck body 2 with guide seats oriented at an angle to the chuck axis 3, in which are carried in a longitudinally movable manner clamping jaws 4 that have a radially external row of teeth 5 for engagement with the clamping threads of a threaded ring 6. This threaded ring 6 is coupled in a rotationally fixed manner to a clamping sleeve 7 that serves to move the clamping jaws 4. In the exemplary embodiment shown in the drawing it is possible within the scope of the invention to implement the clamping sleeve 7 and the threaded ring 6 as a single piece, since the clamping sleeve 7 is installed on the chuck body 2 axially from the front and can be secured by a retaining ring.

At its axially rearward end, the chuck body 2 has a receptacle 8. An adapter body 9 can be placed in this receptacle 8 and coupled in a torque-transmitting manner, specifically by means of a threaded joint having an external thread formed on the axially forward end of the adapter body 9 and an internal thread formed in the receptacle 8. For detachable connection to the drilling spindle of a power drill, the adapter body 9 has an adapter receptacle 10, and has in the wall thereof at least one detent element 13 movable by a release sleeve 12. Formed on the inner circumference of the release sleeve 12 is a control cam 14 for bearing against the detent element 13 implemented as a detent ball. In addition, a return spring 15 is present that bears axially against the release sleeve 13 and braces against the clamping sleeve 7 when the adapter body 9 is attached to the chuck body 2. As explained above, a threaded joint is formed between the chuck body 2 and the adapter body 9. A drive insert 16 can be pressed into the adapter body 9, resulting in wedging of the threads between the adapter body 9 and the chuck body 2. The drive insert 16 is designed to be non-round in cross-section, namely as a hexagon in the exemplary embodiment shown in the drawings. Moreover, the drive insert 16 projects into the adapter receptacle 10 so that a suitable correspondingly shaped drilling spindle having a spindle receptacle matched to the cross-section of the drive insert can be plugged onto the drive insert. Also associated with the spindle is a groove in the circumferential direction into which the detent ball can enter.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A drill chuck comprising:
   a chuck body that has a receptacle on an axially rearward end;
   clamping jaws that are movable relative to a chuck axis;
   a clamping sleeve that is adapted to move the clamping jaws; and
   an adapter body arrangable in the receptacle and coupled in a torque-transmitting manner, the adapter body having an adapter receptacle for detachable connection to a drilling spindle of a power drill and having in a wall of the adapter receptacle at least one detent element that is moveable by a release sleeve,
   wherein a control cam is provided on an inner circumference of the release sleeve to bear against a detent element or a detent ball,
   wherein a return spring bears axially against the release sleeve, and
   wherein the return spring braces against the clamping sleeve when the adapter body is attached to the chuck body.

2. The drill chuck according to claim 1, wherein the chuck body and the adapter body are connectable by a threaded joint, and wherein a drive insert is adapted to be pressed into the adapter body after the threaded joint is established to wedge threads and transmit torque from the drilling spindle.

3. The drill chuck according to claim 2, wherein the drive insert is non-round in cross-section and projects into the adapter receptacle.

* * * * *